(12) United States Patent  
Sandbach et al.

(10) Patent No.: US 6,639,162 B2
(45) Date of Patent: Oct. 28, 2003

(54) INPUT DEVICE

(75) Inventors: David Lee Sandbach, London (GB);
Christopher Chapman, Oxon (GB);
Stuart Mark Walkington,
Hertfordshire (GB); John Burkitt,
Surrey (GB); Andrew Deakin, London
(GB)

(73) Assignee: Electrotextiles Company Limited,
Hertfordshire (GB)

( * ) Notice: Subject to any disclaimer, the term of this patent is extended or adjusted under 35 U.S.C. 154(b) by 307 days.

(21) Appl. No.: 09/980,218

(22) PCT Filed: Mar. 30, 2001

(86) PCT No.: PCT/GB01/01432

§ 371 (c)(1),
(2), (4) Date: Nov. 29, 2001

(87) PCT Pub. No.: WO01/75923

PCT Pub. Date: Oct. 11, 2001

(65) Prior Publication Data

US 2002/0162732 A1 Nov. 7, 2002

(30) Foreign Application Priority Data

Mar. 30, 2000 (GB) .............................................. 0007679
Nov. 2, 2000 (GB) .............................................. 0026806

(51) Int. Cl.$^7$ .............................................. H01H 13/70
(52) U.S. Cl. .................................................. 200/512
(58) Field of Search ........................ 200/5 A, 512–517

(56) References Cited

U.S. PATENT DOCUMENTS

| 3,617,666 | A | * | 11/1971 | Braue | ........................ | 200/86 R |
| 3,911,215 | A | | 10/1975 | Hurst et al. | .................... | 178/18 |
| 4,220,815 | A | | 9/1980 | Gibson et al. | .................. | 178/18 |
| 4,687,885 | A | | 8/1987 | Talmage, Jr. et al. | ......... | 178/18 |
| 4,707,845 | A | | 11/1987 | Krein et al. | .................... | 178/19 |
| 4,798,919 | A | | 1/1989 | Miessler et al. | ............... | 178/18 |
| 4,818,829 | A | * | 4/1989 | Nopper et al. | ............... | 200/514 |
| 5,159,159 | A | | 10/1992 | Asher | .......................... | 178/18 |
| 5,220,521 | A | | 6/1993 | Kikinis | ................... | 364/709.08 |
| 5,262,778 | A | | 11/1993 | Saunders | ...................... | 341/34 |
| 5,448,028 | A | * | 9/1995 | Filion et al. | .............. | 200/52 R |
| 5,453,941 | A | | 9/1995 | Yoshikawa | .................. | 364/558 |
| 5,686,705 | A | | 11/1997 | Conroy et al. | ................ | 178/19 |
| 5,815,139 | A | | 9/1998 | Yoshikawa et al. | ......... | 345/157 |
| 5,852,260 | A | | 12/1998 | Yoshkawa | ................ | 178/18.01 |
| 5,911,317 | A | | 6/1999 | Tsai | .......................... | 200/514 |
| 5,953,199 | A | * | 9/1999 | Owens | ........................ | 361/212 |
| 6,178,619 | B1 | | 1/2001 | Tai | .............................. | 29/122 |
| 6,259,044 | B1 | * | 7/2001 | Paratore et al. | ............. | 200/5 A |
| 6,437,258 | B1 | * | 8/2002 | Sandbach | ................ | 178/18.05 |
| 6,452,479 | B1 | * | 9/2002 | Sandbach | ................... | 338/208 |

FOREIGN PATENT DOCUMENTS

| CH | 545 991 | 11/1971 | ............. | G06F/3/02 |
| DE | 8901047 | 4/1989 | .......... | H01H/13/70 |
| DE | 29921245 | 2/1999 | .......... | G06F/3/023 |

(List continued on next page.)

OTHER PUBLICATIONS

International Search Report—PCT/GB01/01432; EPO—Jul. 24, 2001.

*Primary Examiner*—Michael Friedhofer
(74) *Attorney, Agent, or Firm*—Harness, Dickey & Pierce, PLC

(57) ABSTRACT

A tactile feedback simulating fabrication for use with an input device provides flexible mouldings (801) locatable above detection positions. Flexible mouldings (801) provide tactile feedback simulating a key-press. Each of the mouldings (801) defines a top portion (802) and a flexible side wall (803). A flexible fabric layer (804) is attached to the flexible mouldings thereby significantly enhancing the durability of these mouldings.

17 Claims, 10 Drawing Sheets

FOREIGN PATENT DOCUMENTS

| | | | | |
|---|---|---|---|---|
| EP | 0261770 A2 | 7/1987 | ............ | G06K/11/06 |
| EP | 0772213 | 5/1997 | .......... | H01H/13/70 |
| GB | 2 068 841 A | 1/1980 | .............. | B41J/5/08 |
| GB | 2 168 537 A | 6/1986 | .......... | H01H/13/70 |
| GB | 2 234 115 A | 1/1991 | .......... | H01H/13/70 |
| GB | 2279617 | 1/1995 | ............. | G06F/1/00 |
| GB | 2 341 930 A | 3/2000 | ........... | G06K/11/12 |
| GB | 2 341 933 A | 3/2000 | ........... | G06K/11/12 |
| GB | 2 350 431 A | 11/2000 | ........... | G06K/11/12 |
| GB | 2 350 683 A | 12/2000 | ............. | G01L/1/20 |

\* cited by examiner

INPUT DEVICE

The present invention relates to a flexible manual input device arranged to supply input data to a processing device in response to manual operation.

In the production of manually operable keyboards, it is known to use sheets of elastomeric silicon having a plurality of flexible mouldings arranged to provide tactile feedback thereby simulating the action of a keypress. Although moulded silicon rubber provides a very satisfying tactile response, a problem with the material is that it is relatively weak and is therefore known to fail after excessive use or misuse of the apparatus.

Many techniques are known for strengthening the material but a problem with these known techniques is that they tend to interfere with the operation of the material and thereby reduce its tactile characteristics.

According to an aspect of the present invention, there is provided a flexible manual input device arranged to supply input data to a processing device in response to manual operation, comprising position detection means arranged to identify a contact position; and flexible means positioned above said position detection means, wherein said flexible means has a plurality of flexible mouldings to provide tactile feedback simulating a keypress, each of said mouldings defines a top portion and a flexible side wall, and a flexible outer layer is attached to top portions of a plurality of said mouldings.

In a preferred embodiment, the flexible outer layer is a fabric and said fabric may be knitted or said fabric may be woven.

It is possible for the device to be used with many hand-held apparatus but preferably the processing device is a hand-held computer.

The invention will now be decsribed by way of example only, with reference to the accompanying drawings in which.

Figure 6:
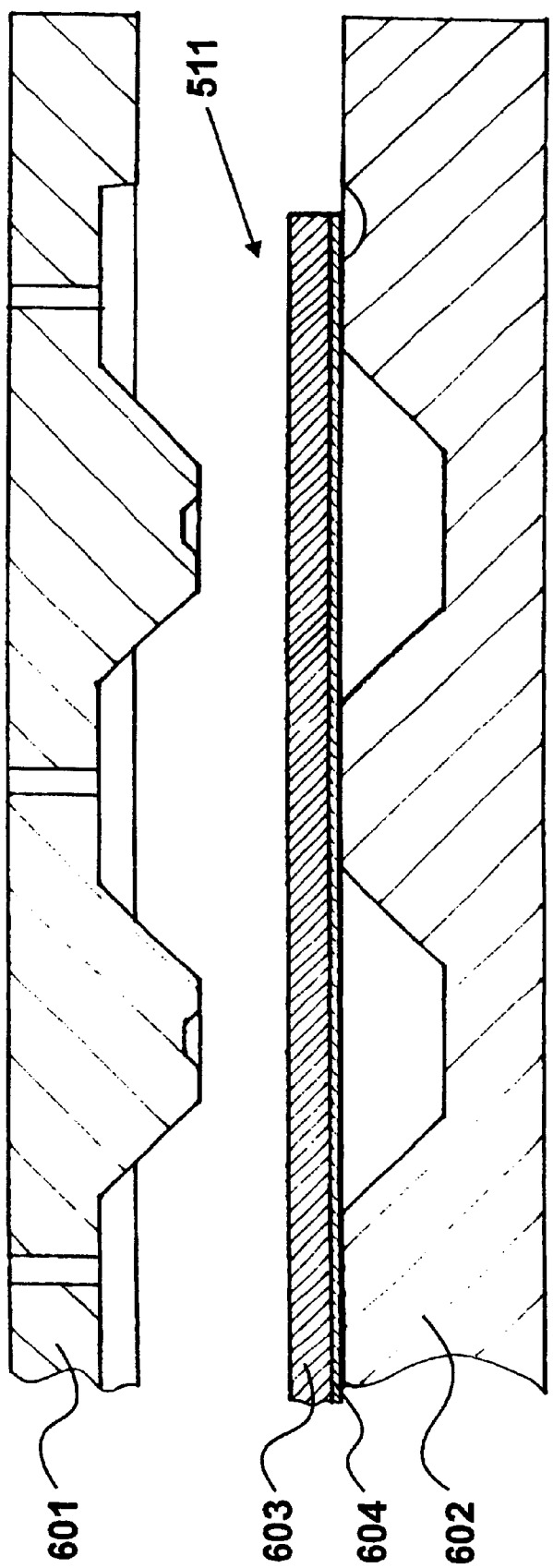
FIG. 6 shows a composite portion of the type identified in FIG. 5.
Figure 7:
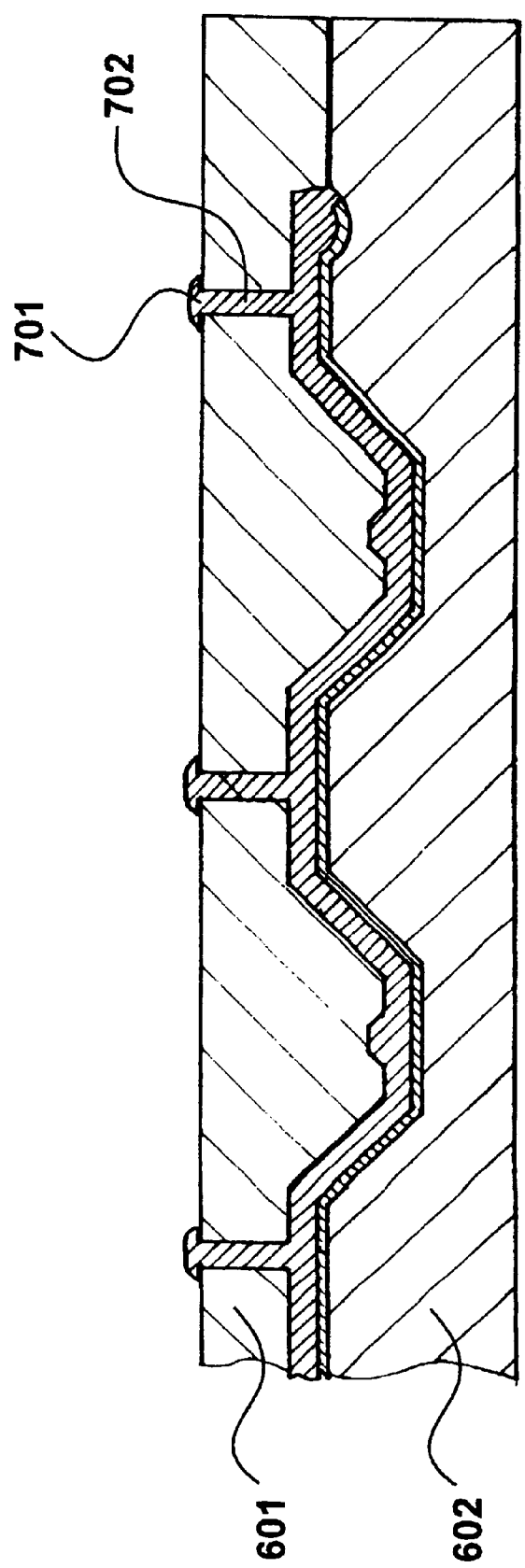
Figure 8:
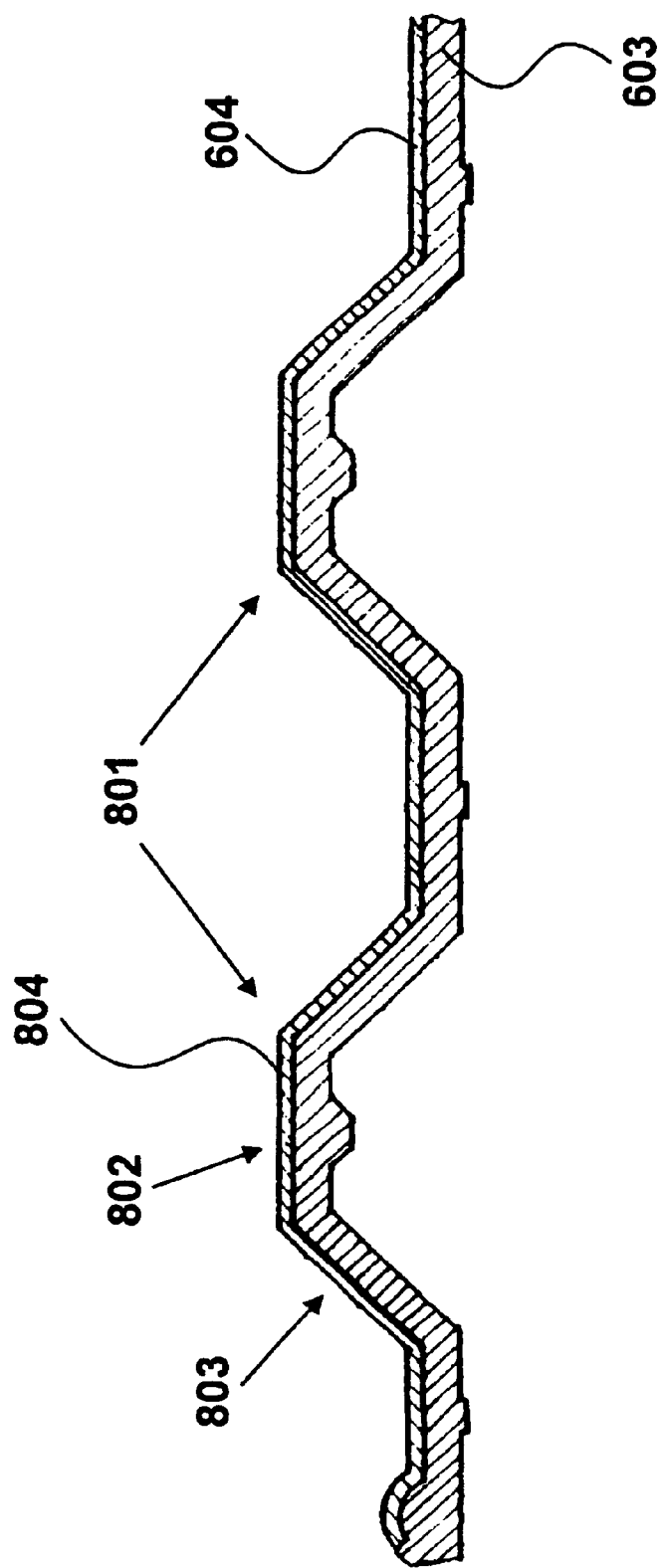
Figure 9:
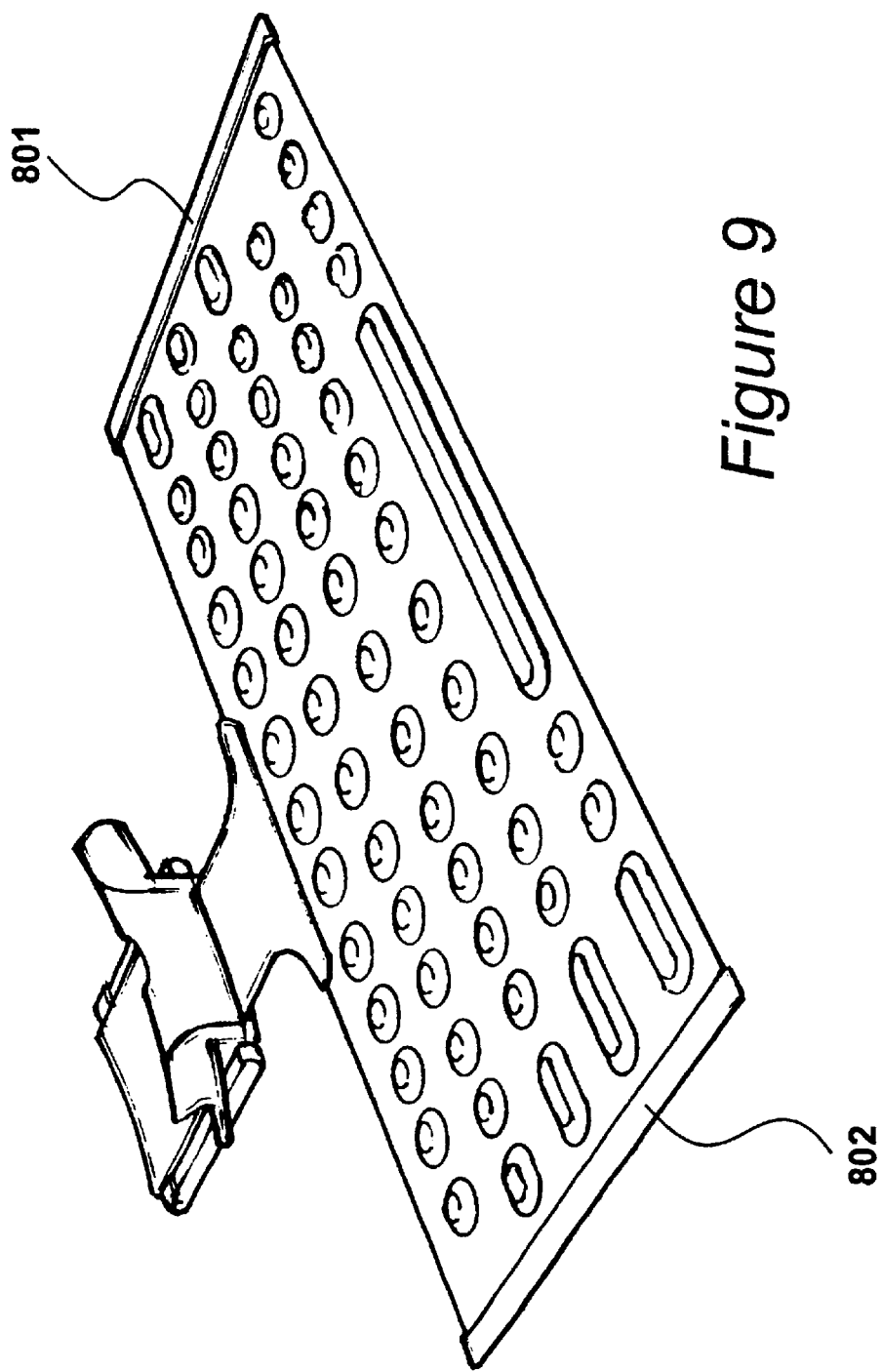
Figure 10:
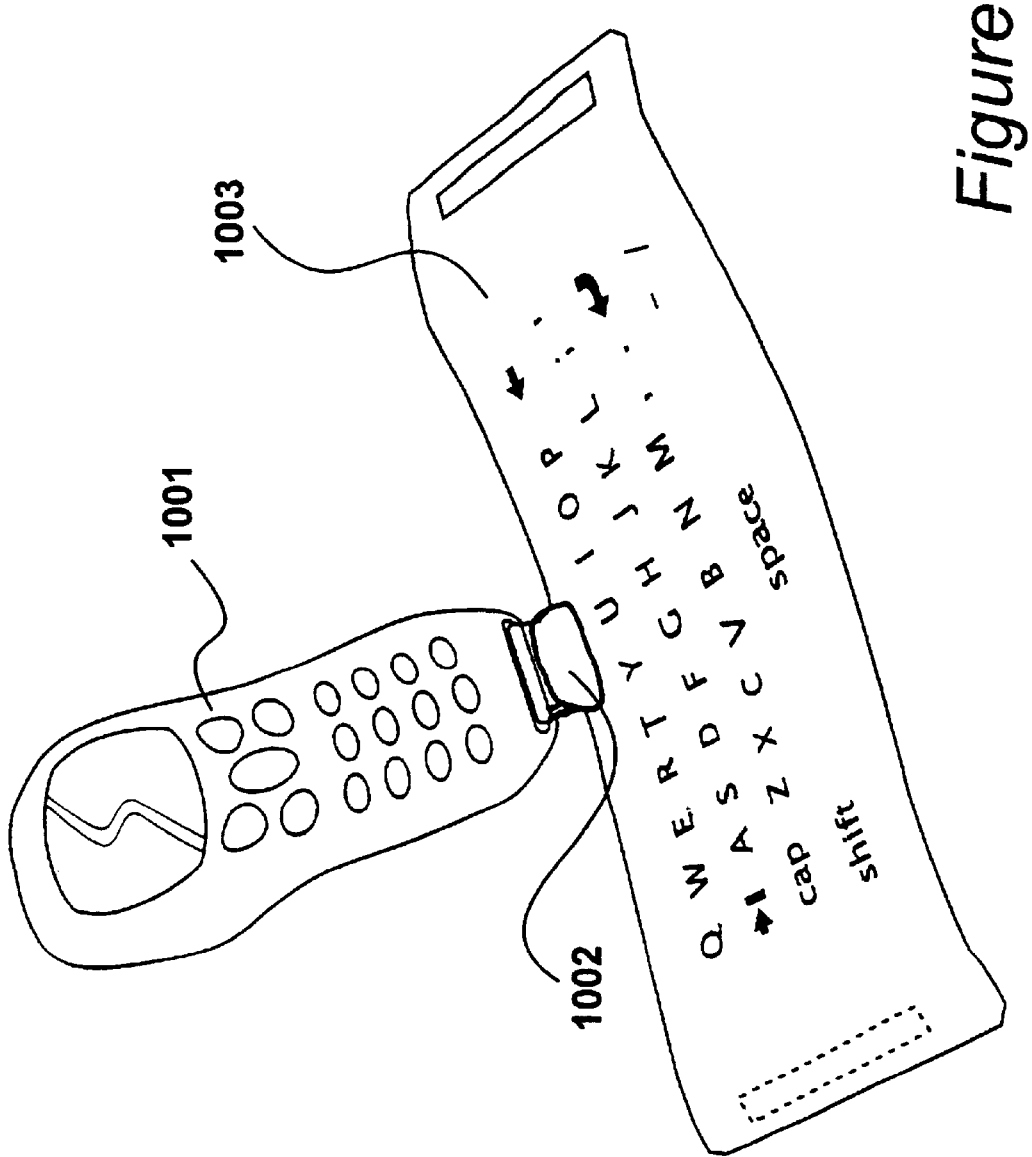

FIG. 7 details further operations of the process identified in FIG. 6;

FIG. 8 illustrates a composite assembly produced by the process shown in FIG. 7;

FIG. 9 shows a keyboard embodying the present invention for use with a hand-held computer; and FIG. 10 shows a keyboard embodying the present invention in use with a mobile cellular telephone.

FIG. 1

A flexible manual input device embodying the present invention consists of a position detection device working in co-operation with a flexible cover configured to provide tactile feedback. Preferably, the position detection means is a fabric position detection device 101 having a plurality of fabric layers, operating with a detection processor in order to produce position signal on output contacts 102 and 103. A position detection device of this type is described in European patent publication No. 0 989 509.

As an alternative to using a fabric based position detection system, it is also possible to exploit the invention with other types of detection systems, such as switch arrays printed onto polyester films, usually referred to as flexi-circuits in the art.

Figure 1:
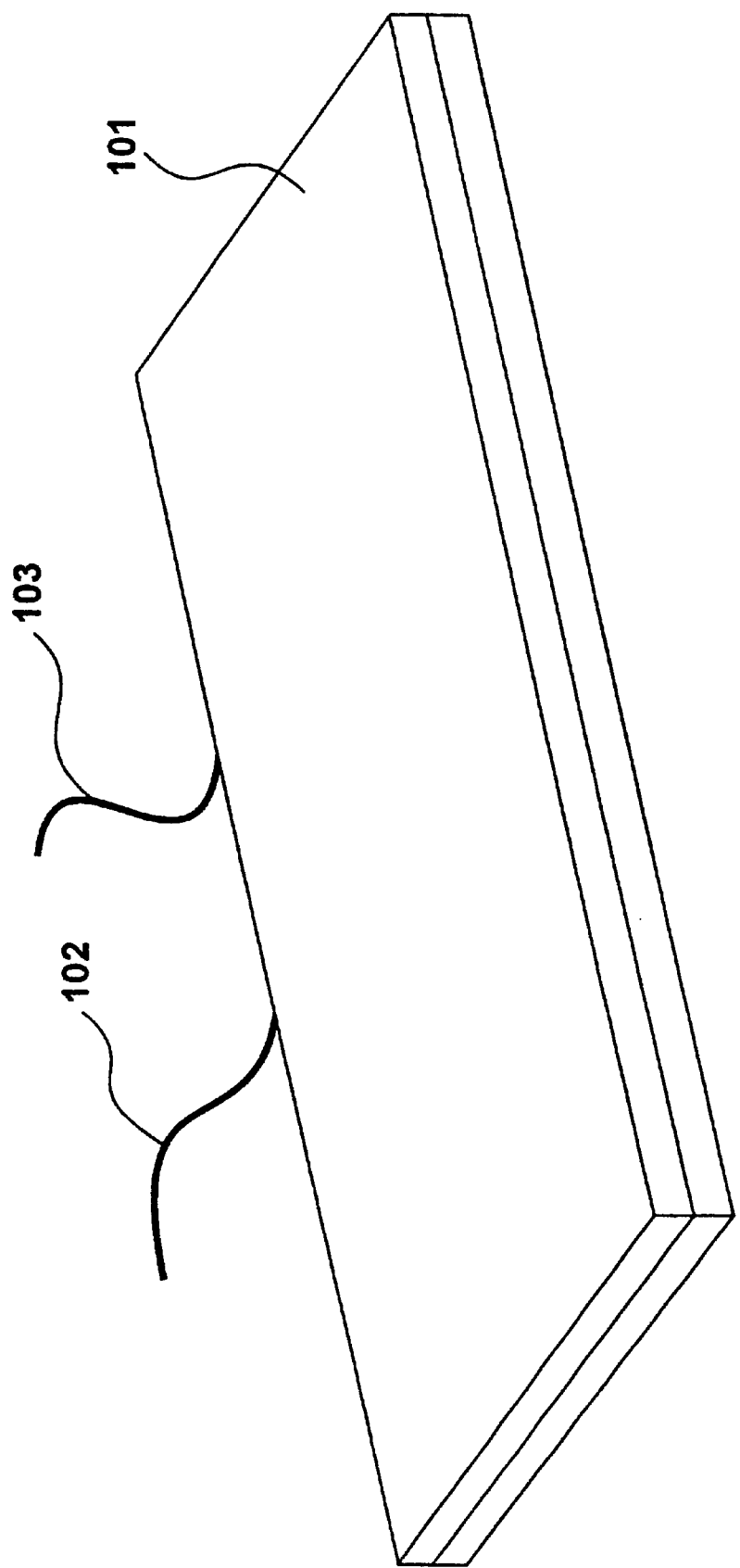
FIG. 1 shows a fabric position detection device.

The position detector as shown in FIG. 1 could provide the basis for a manually operable keyboard device with minimal additional modifications made thereto. However, a problem with the position detector device shown in FIG. 1 is that it provides very little in the way of tactile feedback when a notional key is depressed by a finger resulting in the detector experiencing a mechanical interaction. The detector itself has very little give and therefore the degree of displacement that is felt is relatively minimal as increased force is applied. Operators are more familiar with keys on keyboards that actually give to a degree such that there is tactile feedback when a key depression takes place. Without this feedback, the operator is not reassured that a key-press has properly taken place, which may lead to inaccurate data input or a reduction in input speed.

FIG. 2

Figure 2:
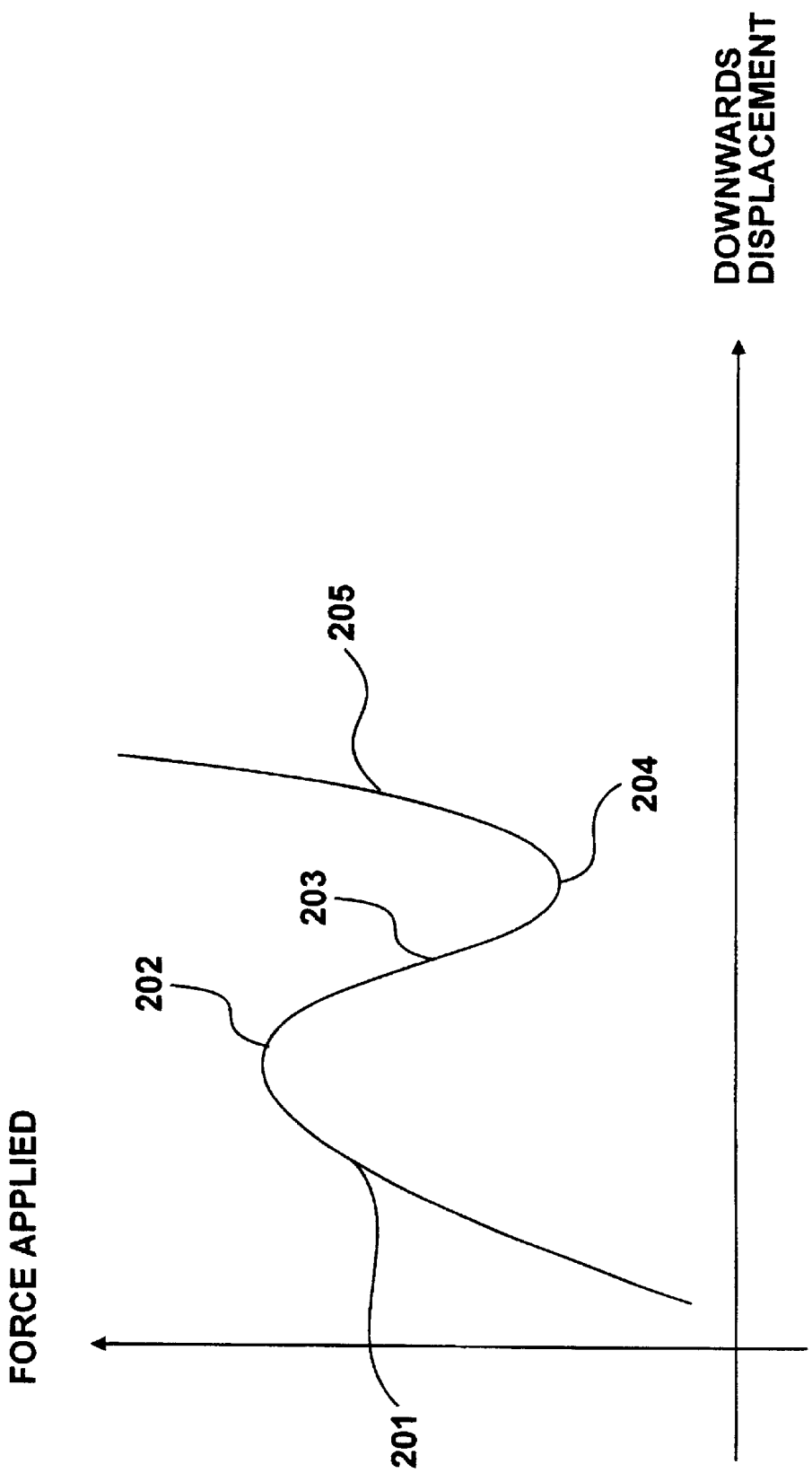
FIG. 2 shows a response curve for a manually operable device with a tactile feedback.

A response curve for a manually operable device with tactile feedback is illustrated in FIG. 2. In FIG. 2, applied force is plotted against downward displacement. Initially, as force is applied by the operation of a finger for example, a degree of downward displacement takes place as illustrated by portion 201 of the curve. However, at position 202 the behaviour of the device suddenly changes. As illustrated by portion 203, significant downward displacement occurs even though the force applied reduces. A sudden giving way of the device provides feedback to the operator to the effect that the key has been pressed. This is particular felt at position 204 where the rapid downwards displacement ceases and further displacement is only produced with the application of more force. Furthermore, at portion 205 a significant degree of force is required in order to achieve any level of displacement. This effectively represents the bottom of the key's travel.

Thus, a device is required which initially resists movement in the downwards direction until a point is reached (point 202) in which significant further downwards movement occurs with a reduction in pressure, thereby providing feedback to the operator to the effect that the key has been properly pressed.

FIG. 3

Figure 3:
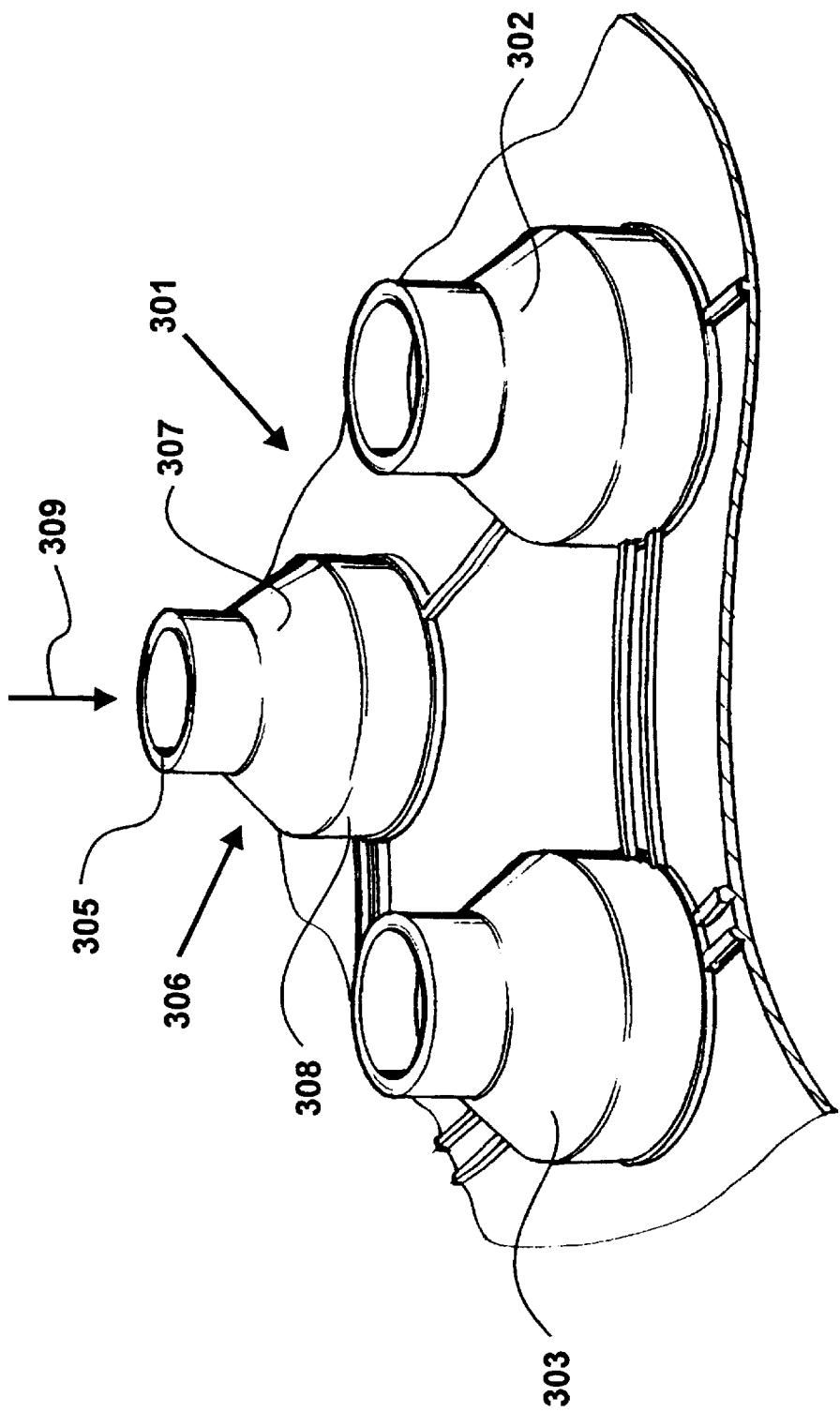
FIG. 3 illustrates a flexible device having the characteristic identified in FIG. 2.

A flexible device providing a force/displacement characteristic of the type shown in FIG. 2 is illustrated in FIG. 3. A sheet 301 of a moulded elastomeric silicon has a plurality of flexible mouldings 302, 303 that provide tactile feedback simulating a keypress. Each of the mouldings defines a top portion 305 and a flexible side wall 306. In this example, the flexible side wall has a domed portion 307 and a cylindrical portion 308. Upon the application of pressure in the direction indicated by arrow 309, it is the flexible side wall 306 collapses to provide a degree of significant downward displacement with reduced force applied thereto. However, the elastomeric nature of the material ensures that the mouldings spring back into their original shape when the displacing pressure of a fingerpress is removed. This springing back of the key is also felt by an operator's finger thereby providing further tactile feedback and confirmation to the effect that a key has been pressed.

In the example shown in FIG. 3, three mouldings are provided. In a working embodiment, each operable key will be provided with its respective moulding thus, in a typical query keyboard a significant number of mouldings are required.

FIG. 4

Figure 4:
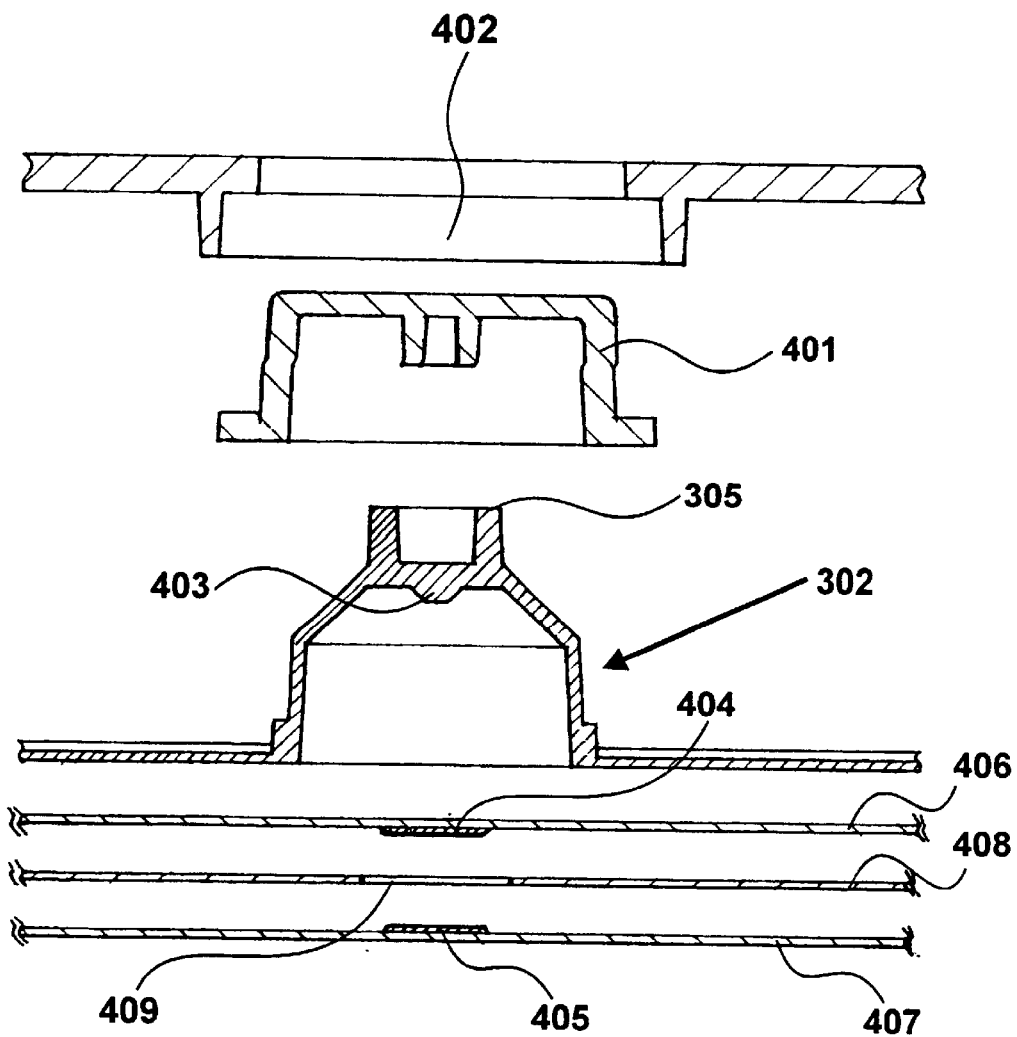
FIG. 4 illustrates flexible mouldings of the type shown in FIG. 3.

Flexible mouldings of the type shown in FIG. 3 may be exploited in a conventional keyboard design as illustrated in FIG. 4. In a conventional keyboard, a plastic key 401 is located upon the top 305 of a moulding, such as moulding 302.

Key 401 is restrained within a housing 402, thereby restricting its movement to essentially downwards and upwards displacement.

The underside of the moulding includes a protruding portion 403 arranged to focus the applied force onto a preferred location for contact to take place. Thus, in this example, a first conductor 404 is brought into contact with a second conductor 405 when pressure is applied to the key 401. Conductor 404 is supported by a polyester sheet 406 with conductor 405 being supported by a similar sheet 407. A similar sheet 408, with an appropriate positioned holes 409, is located between sheets 404 and 405 thereby displacing the contacts until pressure is applied to the key.

In the present embodiment, a flexible manual input device is required such that, for example, it may be used to encase a portable device such as a hand held computer or personal organiser. With this requirement in mind, the use of plastic solid keys 401 would not be appropriate although it is accepted that some form of tactile feedback should be provided in addition to the detection device shown in FIG. 1. A similar device could be used with mobile cellular phones capable of sending text messages.

The position detection device of FIG. 1 is arranged to identify contact position representing a key-press. A flexible sheet is positioned above the position detector in order to provide tactile feedback. The sheet has a moulding for each key location and each moulding declines a top portion. In addition, a fabric outer layer is attached to the top portions of the mouldings. Thus, in this way, the mouldings provide tactile feedback and the integrity of the mouldings is maintained, thereby significantly enhancing their operational life, by the application of the flexible outer layer.

A flexible device to provide tactile feedback is fabricated by combining elastomeric silicon substantially similar to that shown in FIG. 3 with a flexible fabric layer where the fabric and the elastomeric silicon are brought into contact and held in contact. In a possible embodiment, the two layers could be held together using a suitable adhesive but in a preferred embodiment the fabric layer is combined with the elastomeric silicon prior to the elastomeric silicon being cured, through a process of applied temperature and pressure.

FIG. 5

Figure 5:
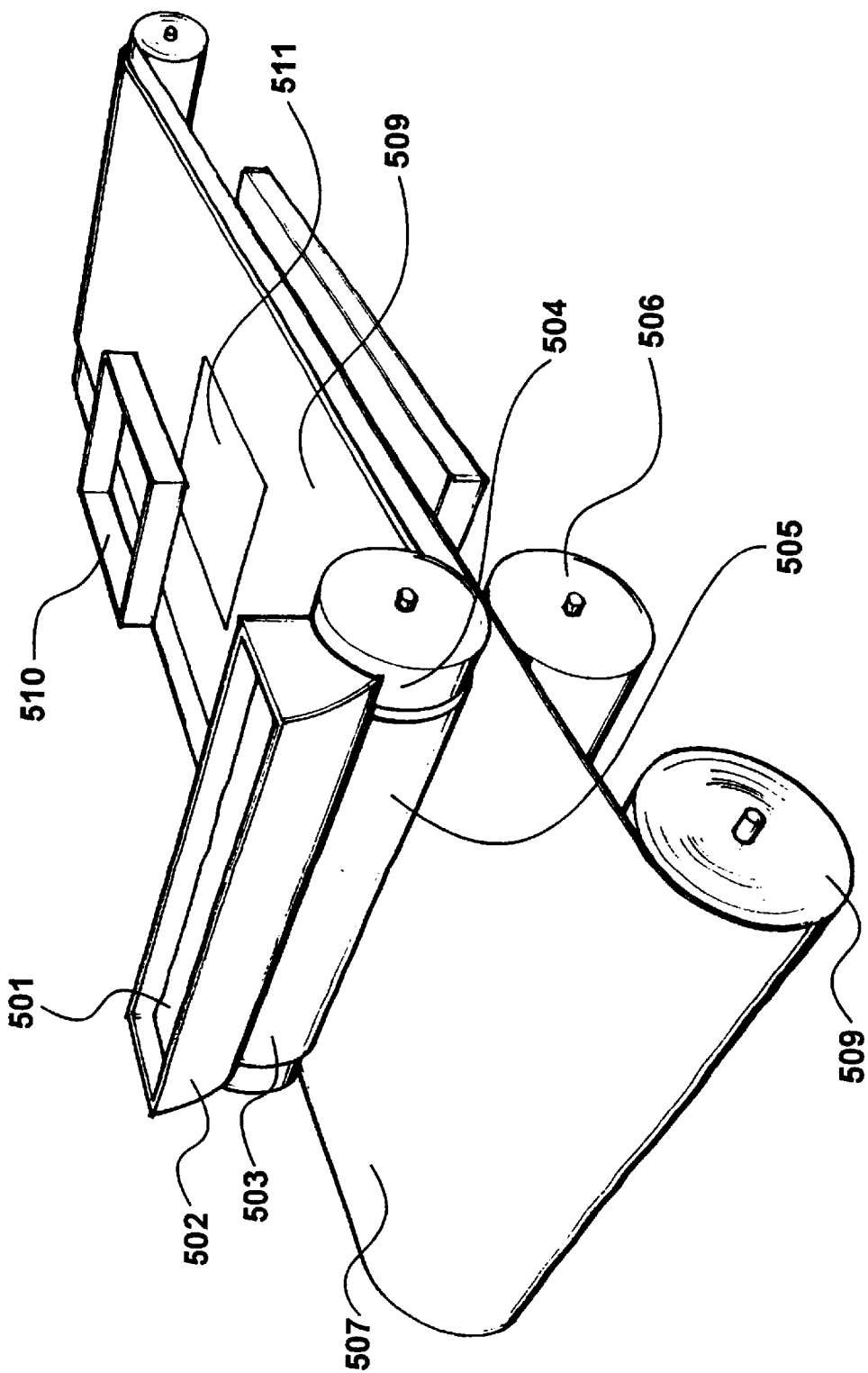
FIG. 5 illustrates the fabrication process.

A fabrication process is illustrated in FIG. 5, essentially involving the adding of the elastomeric silicon to the fabric outer layer through a process of calendering.

A two-part mixture of heat curable silicon rubber 501 is placed within a reservoir 502. Reservoir 502 includes a blade at its lower location 503 displaced from a transfer roller 504 so as to apply a layer 505 of silicon rubber onto said transfer roller 504 of a predetermined thickness.

Transfer roller 504 co-operates with a pinch roller 506, arranged to receive outer layer fabric 507 from a fabric roll 508. Thus the calendering process consists of applying layer 505 to fabric 507 so as to create a composite construction 509 in which a layer of silicon rubber of a predetermined thickness in its uncured form has been laid onto a layer of fabric 507. Portions of the composite layers are cutout from 509 via cutting blade 510 to provide composite portions 511 for subsequent processing.

FIG. 6

A composite portion 511 is shown in FIG. 6 positioned between mould tools, consisting of an upper tool 601 and a lower tool 602. The silicon rubber portion 603 of the composite is placed in contact with the upper tool 601 and the fabric layer 604 of the composite is placed in contact with lower tool 602.

FIG. 7

Upper tool 601 is brought into contact with lower tool 602 and heat is applied to a temperature of one hundred and eighty degrees centigrade so as to cure the silicon rubber and thereby form an elastomeric silicon having a shore hardness of forty-five. The structure of fabric 604 is such as to allow a degree of defamation during the curing process. Possibly, the fabric may stretch but for the application herein, it is not necessary for the fabric to return to its original condition because any elastic operations are facilitated by the provision of the silicon rubber. Excess silicon rubber 701 is removed through vents 702 and then trimmed after the rubber has been cured. The resulting structure, when removed from tool 601 and 602 is substantially similar to the configuration shown in FIG. 3. However, the mouldings have a layer of fabric attached thereto and as such have significantly increase the strength and resilience. In addition, the outer fabric surface provides a surface that may directly come into contact with mechanical interaction and thereby provide an outer for the resulting fabric keyboard.

FIG. 8

The composite assembly produced by the process shown in FIG. 7 is removed from the mould and inverted as shown in FIG. 8, so as to present the silicon rubber surface to the detector shown in FIG. 1. In this way, the moulding has a plurality of flexible means arranged to be positioned above the position detection means of the keyboard. Flexible mouldings 801 provide tactile feedback simulating a keypress. Each of the mouldings defines a top portion 802 and a flexible side wall 803. A flexible outer layer 804, in the form of the fabric, is attached to the top portions of the mouldings. In the embodiment shown in FIG. 8, the flexible outer fabric is also attached to the flexible side walls and to locations between flexible mouldings. This results in the production of a keyboard assembly of the type shown in FIG. 8.

FIG. 9

In this example, the tactile feedback outer surface composite has been attached to the position detector shown in FIG. 1 by end caps 801, 802. In addition, an interface device 803 has been connected to the position detector in order to provide an interface to a hand-held computer such that the keyboard may be used in combination with a hand-held computer.

Additional finishes may be applied to the keyboard and, in particular, it is desirable to identify alpha numeric symbols for the individual keys. Preferably, before symbols are printed onto the key positions, the surface of the key is hardened by the application of an epoxy resin or a cross-linking polymerising plastics material. Thereafter, having provided a hard smooth surface by the application of these materials, high definition characters may be printed thereon. The hardening of the key surface also assists in terms of enhancing the mechanical interaction when a key is pressed.

In the preferred embodiment, the enhanced tactile feedback device has been used in combination with a fabric keyboard. However, it should be appreciated that the composite may also be used with conventional keyboards where the fabric outer surface provides substantially enhanced durability. For example, without the fabric outer surface, it is estimated that a silicon rubber tactile feedback enhancer of the type shown in FIG. 3 will function for approximately three hundred thousand keypress operations. However, when the fabric enhancing layer has been applied, it is estimated that the tactile feedback mechanism will remain fully operational for in excess of ten million keypress operations.

FIG. 10

A flexible keyboard embodying the present invention in use with a mobile telephone is shown in FIG. 10. A mobile telephone 1001 is attached to an interface device 1002 of a flexible keyboard 1003. When not in use, the flexible keyboard 1003 may be wrapped around the mobile telephone 1001 thereby providing protection for the mobile phone while minimising additional bulk.

What is claimed is:

1. A flexible manual input device arranged to supply input data to a processing device in response to manual operation, comprising
 position detection means arranged to identify a contact position; and
 flexible means positioned above said position detection means, wherein
 said flexible means has a plurality of flexible mouldings such that each of said mouldings defines a top portion and flexible side wall,
 said flexible side walls are configured to deform on application of manual pressure during a key-press, and
 a flexible outer fabric layer is attached to the top portions of a plurality of said mouldings.

2. An input device according to claim 1, wherein said flexible outer fabric layer is knitted.

3. An input device according to claim 1, wherein said processing device is a hand-held computer.

4. An input device according to claim 1, wherein said processing device is a mobile cellular telephone.

5. An input device according to claim 1, wherein said position detection means comprises a plurality of fabric layers having conductive fibres.

6. An input device according to claim 1, wherein said flexible means is a sheet of moulded elastomeric silicon.

7. An input device according to claim 6, wherein said moulded sheet defines substantially flat regions between said mouldings.

8. An input device according to claim 7, wherein said flexible outer layer is attached to said flat regions.

9. An input device according to claim 6, wherein said flexible outer layer is attached during the curing of said elastomeric silicon.

10. A method of fabricating a flexible tactile feedback simulating flexible means for operation with a position detector, comprising the steps of
 applying a layer of mouldable material to a flexible fabric cover; and
 moulding said mouldable material to form a plurality of flexible mouldings with said flexible fabric cover attached thereto, wherein
 said flexible mouldings have a flexible side wall configured to deform on application of manual pressure.

11. A method according to claim 1 said fabric is knitted or wherein said fabric is woven.

12. A method according to claim 10, wherein said tactile feedback simulating flexible means is attached to a keyboard and said keyboard is interfaced to a hand-held computer or a mobile cellular telephone.

13. A method according to claim 10, wherein said tactile feedback simulating flexible means is attached to a position detector having a plurality of fabric layers with conductive fibres.

14. A method according to claim 10, wherein said tactile feedback simulating means is attached to a flexi-circuit having a plurality of conductive fibres arranged in a switch matrix.

15. A method according to claim 10, wherein said layer of mouldable material is elastomeric silicon.

16. A method according to claim 10, wherein said flexible mouldings have substantially flat regions therebetween and said flexible cover is attached to both said flexible mouldings and to said flat regions.

17. A method according to claim 16, wherein said flexible cover is attached during the curing of said elastomeric silicon.

* * * * *